April 6, 1948.  M. A. CHAVANNES  2,439,157

METHOD OF MAKING THIN RUBBER FILMS

Filed Oct. 4, 1941  2 Sheets-Sheet 1

INVENTOR
MARC A. CHAVANNES

ATTORNEY

April 6, 1948. M. A. CHAVANNES 2,439,157
METHOD OF MAKING THIN RUBBER FILMS
Filed Oct. 4, 1941 2 Sheets-Sheet 2
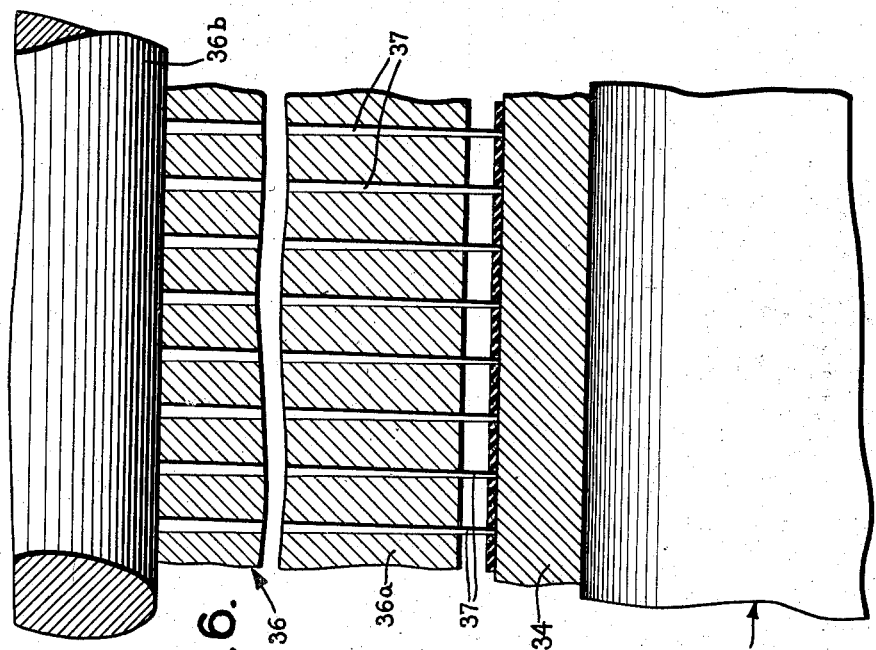
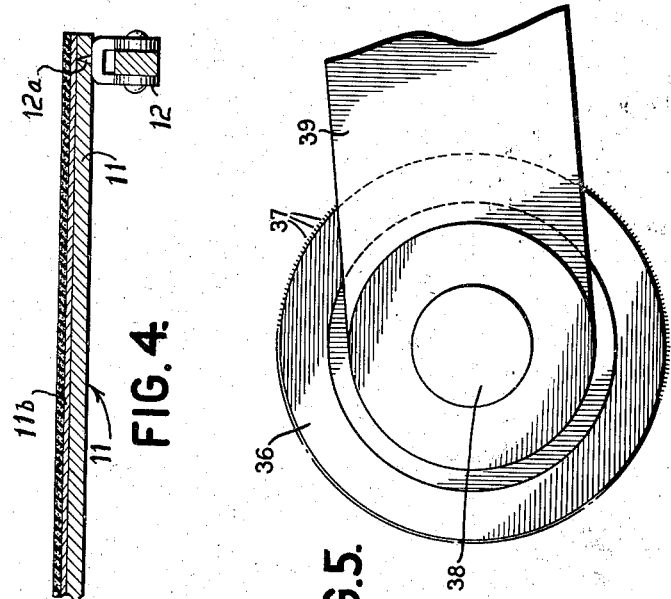
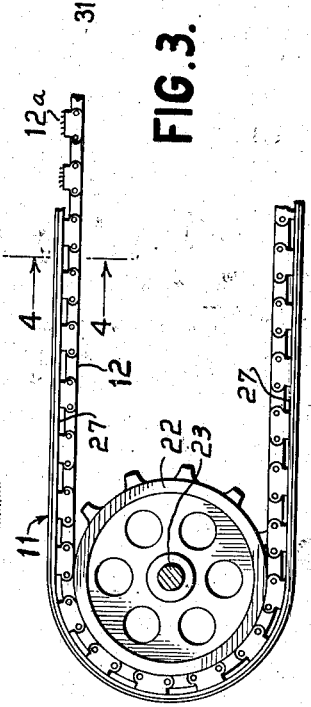
INVENTOR
MARC A. CHAVANNES
BY
ATTORNEY Patented Apr. 6, 1948

2,439,157

UNITED STATES PATENT OFFICE 2,439,157

METHOD OF MAKING THIN RUBBER FILMS

Marc Alfred Chavannes, Genthod, Switzerland, assignor to American Ecla Corporation, Dover, Del., a corporation of Delaware Application October 4, 1941, Serial No. 413,585

9 Claims. (Cl. 18—57)

This invention relates to an improved method of making thin rubber films of a novel character.

In accordance with the present invention, a water-proof fabric may be produced which has precisely the same feel and appearance as ordinary non-waterproof fabric, and is no stiffer and of no noticeably greater weight. Toward this end, I have discovered a way in which a very thin rubber film may be produced and this, when appropriately incorporated between a pair of ordinary woven fabrics or between a woven and a knit fabric or the like, is capable of positively preventing the passage of water through the fabric, and is capable of withstanding the force of a heavy down-pour of rain as well as the hardest usage encountered in ordinary wear. Moreover, in accordance with the invention, the rubber film may be perforated to provide a series of extremely small openings which will permit the passage of air through the fabric, but at the same time will prevent effectively the passage of water even in the heaviest rainfall. This may be designated "micro-porosity."

In the production of the improved fabric, it is important to form a rubber film or the like of substantially uniform thickness throughout its area and so thin that it adds little weight to the composite fabric of which it forms a part. I have discovered that self-sustaining rubber films, having a thickness of as little as .00025 of an inch and weighing no more than 6 grams per sq. inch can be produced of a substantially uniform thickness and of a sufficient tensile strength to enable handling or treatment in the manner to be explained, and when once combined with and supported by base fabrics, at least one of which is woven, they are readily able to withstand the forces to which they may be subjected in the use of the finished fabrics.

In the improved water-proof fabric the rubber film may be of a thickness between .00025 and .001 of an inch and reasonably soft and pliable fabrics may be produced with films up to .0015 of an inch in thickness.

Films of the character contemplated by the present invention cannot be produced by coating or spraying on the fabrics themselves but only by spraying the colloidal dispersion, such as a latex dispersion, on a flat and smooth surface, similar to the surface of a sheet of glass, from which the film may subsequently be stripped or slipped off and then adhesively united with suitable base fabrics.

I have discovered that in the production of such thin films it is important to observe the following:

1. The spraying operation must be so conducted and the dispersion must be of such character that the water content of the fine droplets sprayed will not evaporate substantially during the spraying operation before coming in contact with the smooth surface on which the film is to be formed. It is important that when the droplets touch this surface, they shall spread on it and form a smooth, uniform coating.

2. As soon as the latex strikes and spreads on the surface, the water content of the dispersion must evaporate before the dispersion has had an opportunity to run due to the merging of the droplets together. This may be achieved by appropriately regulating the size of the droplets, which should be very small, and the quantity delivered for each coat.

3. The atomization of the dispersion in the spraying operation must not be carried too far, otherwise the latex when it reaches the smooth surface will be in such a state as to be substantially like a dust and the subsequent sprayings would create lumps and bumps of rubber instead of a regular, smooth film.

To fulfill these conditions, I have discovered that the dispersion should preferably be sprayed by air at a relatively low pressure; that the dry content of rubber in the dispersion should not exceed about 20%; that the temperature of the surface on which the dispersion is sprayed should not exceed about 200° F.

If the temperature of the surface to be sprayed is over 200° F., the water content of the dispersion will evaporate too suddenly and the film so created will be bumpy and porous. It is important, therefore, to maintain the temperature within relatively narrow limits; it should not be too low so as to allow the dispersion to run on the surface, nor should it be so high as to create a porous and irregular film. So also, the spray reaching the smooth surface may be too dry if the spray guns are placed too far from the surface. The distance selected between the guns and the surface depends in part upon the amount of latex to be sprayed. For the formation of the thin films specified, best results have been obtained by discharging latex from each gun at a rate not exceeding about 0.1 gram per second (dry basis). In this case the ends of the guns should be not more than 15 inches from the surface and may be as little as 11 inches therefrom. The best results have been attained at a distance of 13 inches. It will be appreciated that under those conditions only a very fine layer will be sprayed upon one passage of a gun over the surface or one passage under the gun of the surface to be sprayed, if this surface is movable. To complete a film under those conditions requires a great number of relative passages between the surface and the spraying equipment. For example, in the production of a film having a thickness of, say, between .00025 and .0015 of an inch, ten, or more, separate coatings may be employed and a satisfactory, uniform film cannot be formed by a fewer number of layers or coatings.

Another important feature of the invention is the constitution of the dispersion in such a way that the film formed on the smooth surface will not adhere to it too strongly so that the film may be stripped off at a commercially practicable speed without tearing it. For this purpose, a dispersion of a relatively pure rubber should be used, containing not more than 25% of any material having greater adhesivity for the material of which the surface to be sprayed is formed than does the rubber itself. However, if the character of the forming surface and of the latex and the filler are appropriately selected, as by providing a surface that is particularly non-adhesive to the selected filler, as well as to the latex, a higher percentage of filler may be employed. Any material diminishing too much the tensile strength of the film of rubber has also to be eliminated. The surface itself should be formed of a material having the least possible adhesivity to the rubber and one that is not altered by the relatively high temperature necessitated for the removal of the water content of the dispersion to form the film.

For certain purposes, it may be desirable to form the film of a latex of one composition at one surface and of another composition at the other surface. This will enable the film to be united with only a single woven fabric, for example. One surface of the film, formed by the first coatings of latex sprayed upon the smooth surface, may be of a substantially pure rubber of the type hereinbefore mentioned. The other surface may contain substantial quantities of filler, while the intermediate portions of the film may vary suitably between the two extremes. This will provide the necessary film strength and ease of stripping of the film and at the same time will provide a smooth, outer surface containing a high percentage of fillers which impart wear and age resistance and a more pleasing feel than the pure rubber. The improved process lends itself readily to the production of this new type of film.

Other objects, features and advantages of the invention will appear from a detailed description of certain illustrative forms of the same which will now be given in conjunction with the accompanying drawings, in which:

Fig. 3 is an enlarged detail showing a section of a conveyor chain and belt employed in the unit of Fig. 1.

Fig. 4 is an enlarged detail in section along the line 4—4 of Fig. 3.

Fig. 5 is an enlarged detail showing in end elevation a perforating roll used in the unit of Fig. 1, and Fig. 6 is a greatly magnified section through a portion of the material at the nip of the perforating roller as indicated by the arrow at 7 in Fig. 1.

Figure 1:
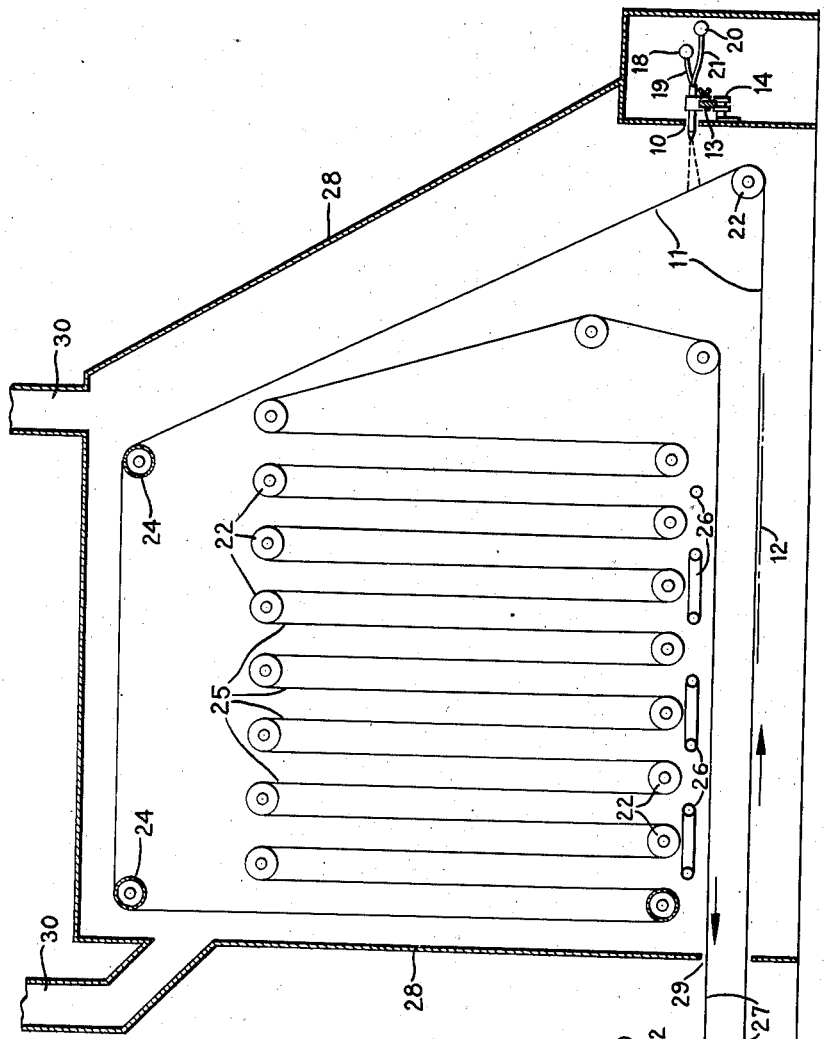
Fig. 1 is a schematic view showing, in elevation, apparatus suitable for the production of the improved, thin rubber film.

Referring now to Fig. 1, the rubber film is preferably formed by spraying the latex dispersion or the like by means of nozzles 10 directly onto a belt 11 which is carried by a pair of parallel conveyor chains 12. Its edges may suitably be attached to pins or needles 12a projecting from the supporting surfaces of the chains. The belt is formed preferably of a fabric 11a having a smooth coating 11b of pyroxylin varnish or the like applied to the surface which is sprayed.

As mentioned before, it is important that it should be substantially as smooth as glass and of a character that is poorly adhesive to latex and to any filler that may be present in the latex dispersion employed. At the same time, the surface should preferably be of a flexible or pliable nature so that it may be applied to a flexible belt and permitted to bend without cracking and without permanent deformation in moving along a tortuous path of the character indicated. It should be capable of withstanding a temperature of at least 200° F. A pyroxylin-coated belt has been found particularly desirable.

Figure 2:
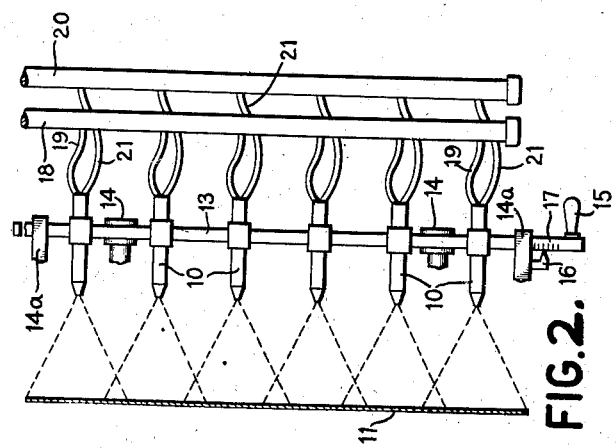
Fig. 2 is a plan view of a shiftable spray nozzle assembly used in the production of the film.

The spray nozzles 10 may be arranged across the width of the belt and so positioned and constructed as to direct a substantially uniform spray across the belt. A certain overlapping may occur, for this purpose, between the fans in the area sprayed by the several nozzles where the fans combine or intermix. For example, about a quarter of the width of the surface reached by one nozzle may overlap with about a quarter of the width of the surface reached by the next adjacent nozzle. However, due to the difficulty of producing a uniform operation of the nozzles and particularly a uniform distribution of the spray across the belt, the nozzles are preferably mounted to shift laterally in relation to the belt. The shifting is preferably step-by-step as the successive coatings are applied to the surface of the belt. It may be effected either automatically or manually. As shown in Fig. 2, the series of spray guns or nozzles 10 may be mounted on a bar 13 slidable on pulleys 14 and held thereon by guides 14a. A handle 15 may be provided for shifting the bar and a fixed pointer 16 cooperating with a suitable scale 17 on the bar may indicate its various positions.

The latex dispersion, or the like, may be supplied to the several nozzles from a suitable supply line 18 connected with each nozzle by means of a flexible hose 19. Air under pressure for creating the desired spray may similarly be supplied from a suitable source through a line 20 connected by a flexible hose 21 with each nozzle. The latter may be of any suitable construction.

In Fig. 1 there is schematically indicated a desirable arrangement of the conveyor chains and belt. The chains are passed around suitable sprocket wheels 22 appropriately located to support and properly direct the various courses of the chains. One or more of the sprocket wheels, such as that mounted on the shaft 23 (Figs. 1 and 3) is driven by connections (not shown) with any suitable source of power so that the chains and belt may be moved continuously at any desired speed. Any desired number of the sprockets may have rollers 24 associated therewith, extending between the chains, so as to lend support to the belt across its width. After receiving each coating at the spray guns, the belt is formed into a series of loops 25 forming a drying section. Here the coated surface is subjected to the drying action of a series of jets of warm air which may be directed into the pockets formed between the loops from pipes or ducts 26. Upon leaving the drying section the belt traverses a horizontal loop 27, which extends rearwardly some distance beyond the drying loops, and it is then carried through the same cycle to receive the second and succeeding coatings. A housing 28 of appropriate shape and construction may surround and enclose the spraying and drying sections and is provided with an opening 29 through which the loop 27 extends. Ducts or flues 30 communicating with the interior of the housing at suitable points and connected with draft-producing means, not shown, may serve to provide a desired circulation of the atmosphere within the chamber and to remove the air after it has taken up a proper amount of the moisture from the drying section.

It is important in the operation of the spraying and drying equipment to so regulate the various operating conditions that each of the successive coatings is substantially dry before the next coating is applied. This is made possible, without raising the temperature of the dryer over about 170° F., so as not to create a porous film, by applying only an extremely thin coating upon each passage of the belt through its cycle. The importance of attaining a desired dryness for each layer of the film is illustrated by the fact that if the dryer is operated at a temperature somewhat lower than required, the latex will run and if the film is not thoroughly dry, it will remain weak and it will not be possible, in a commercial operation, to strip the thin film from the belt, in the manner to be explained, without substantially destroying the same. On the other hand, if the temperature is too high, the drying will be too rapid and a porous film, rather than a smooth, continuous one, will result. The film, as finally produced, should be of such dryness that when stored under normal atmospheric conditions, it has a tendency to increase in weight through the acquisition of moisture.

A typical example of an operation of a commercial unit in accordance with the invention is as follows:

The unit was equipped with a belt formed of a satin stitch fabric of suitable weight to support the load. One surface of this belt was coated with a heat-resistant, elastic, pyroxylin coating. This imparted to the surface of the belt a smoothness almost equivalent to that of glass and yet one capable of being bent around curves of relatively small radius without cracking or permanently deforming. The over-all length of the belt was 120 yards, the belt being attached to the spikes of a conveyor chain, as previously explained, to form a series of loops of the character indicated in Fig. 1. In effect, an endless belt was thus produced capable of being traversed continuously along the path shown. A series of six spray guns was mounted upon the supporting bar 12, these being spaced 9 and ⅝ inches apart. Each gun was of the DeVilbiss type WV-176 equipped with a nozzle for a round spray No. 76. The guns were mounted with their discharge nozzles at a distance of 13 inches from the surface of the belt.

In the operation of the unit, air under a pressure of 4.4 lbs. per square inch and latex under a pressure of 4.5 lbs. per square inch was supplied to the guns. A variation in each of these pressures of about 10% either way is permissible without interfering seriously with the results, but wide variations from the pressures indicated will prevent the production of a satisfactory film. The belt and conveyor chains were operated at a speed of one yard per second, thus requiring a period of two minutes for the completion of a cycle. To build up a rubber film having a thickness of .00025 of an inch, weighing about 6 grams per square yard, each portion of the belt was passed beneath the guns 20 times. Each of the twenty runs of the belt was commenced as a given point passed beneath the guns and terminated as an adjacent but slightly spaced point reaches the guns. The latex dispersion employed contained only 10% rubber. After each run of the belt, the bar 13 supporting the guns was shifted to a new position. After the first run, the guns were shifted to a position 4 and 1¾ inches to the left of their original position. This placed the overlapping portions of the spray fans produced by the guns exactly in the middle of the positions of these overlaps on the first run. For the succeeding coats the bar was shifted alternately to one side and then the other of the position assumed for the second run by suitable increments so as to place the centers of the overlapping portions of the spray fans successively along different lines of the belt at equally spaced intervals. This, in the course of the 20 coatings applied to the belt, provided a substantially uniform thickness of the film of latex across the entire width. The variation in thickness at no point exceeded 10% from the average.

The latex employed in the foregoing operation contained not more than 20% mineral fillers based upon the weight of the rubber itself. Upon the formation of each coating, the water content of the dispersion was driven off in the drier section of the unit before the succeeding coating was applied. For this purpose, the drier was maintained at a temperature of about 170° F.

While it is preferable to use a latex dispersion having a solids content of between 10 and 20% in the spraying of the succesive coats, this may, if desired, be increased to as much as 25% and it may be reduced as far below 10% as desired, so long as the quantity sprayed for each coat is not so great as to cause the coating to run. Of course it would be commercially uneconomical to employ a dispersion having much less than 10% solids due to the expense of evaporating the moisture content. The quantity of rubber applied to the belt upon each passage may be varied between about 0.3 gram and 3.0 grams per square yard, depending upon the thickness of the desired film and the number of coats used to form it. Best results are obtained when a relatively large number of coats are used in building up a film, say between 10 and 20 or even more. The spray produced by the spray guns should be relatively fine and yet not too fine so as to cause the deposit of a fine dust on the surface of the belt. Preferably the droplets forming the spray should be of just sufficient size to spread out in a very thin film over the surface being sprayed, so as to form a continuous coat on each passage of the belt without any danger of running before it is dried in the manner explained.

After a film of the desired thickness has been formed in the manner explained, it is stripped from the belt in the following manner: The edge of the film at its beginning is first worked loose from the smooth surface by the fingers of the operator and when a sufficient section has been thus loosened to enable the film to be properly grasped, a suitable length of a yard or more is stripped by hand from the belt. The free end of this section is then attached to the surface of a roller 31 and the latter rotated to apply a suitable tension to the film sufficient to stretch it between 50 and 100% of its original length. The turning of the roller 31 may be effected either by hand or by suitable connection with a motor or the like. As indicated schematically in Fig. 1, the supporting trunnion 32 of the roller may simply be provided with a crank 33 for manual rotation of the roller. It will be understood that in order to stretch all portions of the film to the extent indicated, as it is stripped from the belt, the roller 31 will need to be turned at a correspondingly greater peripheral speed than the linear speed of the belt. To prevent the successive turns of the film from sticking together as they are wound upon the roller 31, a web of paper 34 is introduced between the successive turns. This paper may be supplied from a roll 35 from which it may be drawn as the roller is turned. The end of the web may be attached to the roller 31 by inserting it between the first turn of the rubber film and the surface of the roller. The surface of the roller 31 and also that of the paper web 34 should be such as to provide substantial friction against the surface of the rubber film as the latter is wound on the roller under tension. The friction should be sufficient to retain the film in its stretched condition and prevent the turns or layers from slipping or creeping.

If it is desired to perforate the rubber film, this is preferably accomplished before the film is combined with the cloth, although it may, if desired, be done after the film and cloth have been combined. In either case, it may be done by a roller 36 provided with a series of fine needles 37. These needles, having a sharp pointed end, may be embedded in a copper cylinder 36a so that only the extreme point of the needle projects beyond the surface of the cylinder. The needles are preferably forced through holes in the cylinder from the inside until their sharp tip ends protrude. The base portions of the needles may then be supported by a mandrel 36b, formed of steel or the like, inserted within the cylinder. To get the smallest perforation possible, only the points of the needles must perforate the film, which is designated 36c in Fig. 6, and it is because of the very thinness of this film that the perforation being made by the sharpest point of the needle is of the microscopic size needed to allow the passage of air without allowing the passage of the water even in case of a heavy or severe rainfall. For this purpose the holes should be of an area between .001 and .01 square millimeter, which will necessitate a substantial pressure, i. e., sufficient to overcome the surface tension of water, in order to force it through. The number of perforating needles employed may vary with the character of the final product desired. In a typical unit, there may be some 100 needles per square inch of the surface of the cylinder.

To avoid the splitting of the film or the increase in the size of the holes, it has been found that the perforation of the film should preferably take place at a point where the latter is fully supported and where the tension in the film is offset by the friction forces previously mentioned. Thus, it has been found desirable to place the roller 36 at such a point in relation to the roller 31 that a substantial section of the film is wrapped around this roller in advance of the point where the perforation takes place. Any suitable means may be provided for supporting the perforating roller and urging it under a desired pressure against the film. For this purpose, its trunnions 38, which may be extensions of the mandrel 36b, may be journaled in the arms of a frame 39 pivoted at 40 on a suitable fixed support. An adjustable weight of springs may be appropriately applied to the arm 39 to provide additional pressure, if desired, but the weight of the roller 36, which need be only about two inches in diameter, is sufficient to perforate the fine films contemplated. Moreover, it is advantageous to have the pressure sufficient only to force the needles through the film and not through the paper 34, as illustrated in Figure 6, thus insuring the perforation of the film by only the extreme tips of the needles.

An advantage of winding the rubber film upon the roller 31 under tension sufficient, say, to stretch the film about 75% is that the perforations in the film upon subsequent release of tension will become correspondingly smaller than when originally made. Thus, a hole of, say, 100 microns in diameter as originally formed will become substantially smaller in diameter upon release of the tension in the film. This is due not only to the contraction of the film as a whole, which would naturally produce a corresponding reduction in the size of any hole through it but it is due, also, and to a greater extent, to the tendency of a rubber film to close up any holes formed in it whenever tension is released or diminished. The elastic forces in the rubber have a strong tendency to close up the opening. Ordinarily, it would be desirable to maintain the film under partial tension when it is combined with the knit or woven fabrics in the manner to be explained. However, this tension may be substantially less than that under which the film is wound upon the roller 31.

By incorporating the film under tension in the composite fabric, its thickness is also reduced. For example, a film which is tensioned to increase its length 50% over its original condition at the time it is combined with a pair of woven fabrics will be about one-third thinner than the original, untensioned film.

For certain purposes it may be desired to combine the rubber film with only one base fabric. In such cases it is desirable to provide the rubber film with a surface on its exposed side which has good wearing qualities, is not tacky, and does not have an objectionable feel. This may be accomplished by introducing a greater quantity of a suitable filler adjacent that surface of the rubber to be exposed. At the same time it is important, in the production and use of the extremely thin films contemplated by the present invention, to form a portion of the cross section of the film of relatively pure rubber. An improved product of this character, having good wear resistance and a pleasant feel at one surface and having a portion of greater tensile strength adjacent the other surface, may readily be produced in accordance with the present invention. Thus, different latex dispersions may be employed in spraying the successive coatings upon the smooth surface of the belt. The first coating, or number of coatings, may be of a substantially pure latex having not over 20% total fillers. The final coats, on the other hand, may contain as much as 200% of the fillers, based on the rubber present in the dispersion. It has been found, however, that a gradual transition between the substantially pure latex and the highly filled latex is desirable in the successive coatings. If an abrupt transition occurs from a series of coats of relatively pure latex to a series of coats of latex having a high filler content, the resulting film will be weak and will not withstand any substantial stretching, such as required to strip it from the smooth surface on which it is formed.

In order to provide the desired tensile strength, a film of the dual surface type described will ordinarily need to be somewhat thicker than a film formed completely of the relatively pure latex. However, dual surface films not exceeding .0005 of an inch may readily be produced in accordance with the invention and stripped from the surface of the smooth belt for combination with a fabric. In forming such a film through the spraying of a large number of light coatings, say twenty in all, it is best to employ relatively pure latex, having not more than 20% fillers based on the rubber content of the dispersion, for the first two coats. A dispersion having 30% fillers, on the same basis, may be used for the third and fourth coats, a dispersion having 40% fillers may be used for the fifth and sixth coats, a dispersion having 50% fillers may be used for the seventh and eighth coats, 75% fillers for the ninth and tenth coats, 100% fillers for the eleventh and twelfth coats, 125% fillers for the thirteenth and fourteenth coats, 150% fillers for the fifteenth and sixteenth coats, 175% fillers for the seventeenth and eighteenth coats, and 200% fillers for the nineteenth and twentieth coats.

In assembling a dual surface film of the type described with a single base fabric, a second fabric is preferably run through the combining rolls to protect the outer surface of the film. This second fabric, however, will not be sprayed with latex and will, therefore, not adhere to the rubber film. It may readily be separated after the combined fabric and film have passed through the combining rolls and calender rolls. In lieu of a second fabric for the protection of the outer surface of the film, any other flexible material, such as a web of paper, may be employed. If desired, the surface of this protecting layer, which is forced against the outer surface of the film, may carry a suitable design, which may then be impressed into the outer surface of the film.

While certain preferred forms of the improved products of the present invention and preferred methods of producing the same have been described in considerable detail, it will be understood that numerous changes and variations may be made in both the product and method without departing from the general principles and scope of the invention. As indicated hereinabove, the invention is especially directed to the production of thin films of rubber and the incorporation of such films in multi-ply fabrics but it is adapted also to the production of similar films and fabrics in which the natural rubber latex is replaced by an aqueous dispersion of crude or reclaimed rubber or synthetic rubber latices and related substances.

A divisional application, Serial No. 729,352 has been filed on February 18, 1947, to cover the novel products, i. e., the thin rubber films and the composite fabrics disclosed herein.

I claim:

1. A method of making extremely thin impervious rubber films which comprises spraying a plurality of successive coatings of rubber latex uniformly upon the surface of a smooth belt to which the latex adheres only lightly, the latex so sprayed being of a concentration of less than 25% but not substantially less than 10% solids and being applied in an amount which is not so great as to cause the coating to run, substantially drying each coating before the application of the next, continuing said successive coatings until a film of desired thickness between .00025 and .0015 is formed and then stripping said film from the belt.

2. A method of making extremely thin impervious rubber films which comprises spraying a plurality of successive coatings of rubber latex upon the surface of the smooth belt to which the latex adheres only lightly, the latex so sprayed being of a concentration of less than 25% but not substantially less than 10% solids and being applied in an amount which is not so great as to cause the coating to run, shifting the spraying means transversely of the belt in the course of forming the successive coatings to effect a more uniform distribution of the latex, substantially drying each coating before the application of the next, continuing said successive coatings until a film of desired thickness between .00025 and .0015 is formed, and then stripping said film from the belt.

3. A method of making extremely thin impervious rubber films which comprises spraying a plurality of successive coatings of rubber latex uniformly upon the surface of a smooth belt to which the latex adheres only lightly, the latex so sprayed being of a concentration of less than 25% but not substantially less than 10% solids and being applied in an amount which is not so great as to cause the coating to run, substantially drying each coating before the application of the next, continuing said successive coatings until a film of desired thickness between .00025 and .0015 is formed and then stripping said film from the belt, the surface of said belt and the composition of said latex bearing such a relation to each other that the tensile strength of said film greatly exceeds the force required to strip it from the belt and the film is not stretched more than 100% in the course of stripping it from the belt.

4. A method of making extremely thin impervious rubber films which comprises spraying a plurality of successive coatings of rubber latex uniformly upon the surface of a smooth belt to which the latex adheres only lightly, the latex so sprayed being of a concentration of less than 25% but not substantially less than 10% solids and being applied in an amount which is not so great as to cause the coating to run, said solids comprising not more than 25% of fillers and impurities, substantially drying each coating before the application of the next, continuing said successive coatings until a film of desired thickness between .00025 and .0015 is formed and then stripping said film from the belt, the surface of said belt being such that the force required to strip the film therefrom will not stretch the film more than 100%.

5. A method of producing a thin rubber film having different filler contents adjacent its two surfaces which comprises spraying a plurality of coats of a latex dispersion of low concentration, drying each coat before the application of the next, and varying the filler content of the successive coats gradually from a relatively pure latex to a highly filled latex.

6. A method of producing a thin rubber film having different filler contents adjacent its two surfaces which comprises spraying a plurality of more than ten coats of a latex dispersion of low concentration, drying each coat before the application of the next, using a latex dispersion having not more than 25% fillers based on the rubber content for the first coat, and using latex dispersions of gradually increasing filler contents for the succeeding coats, the last coat having more than 100% fillers based upon the rubber content of the dispersion.

7. A method of producing an extremely thin impervious rubber film which comprises spraying a plurality of coats of a latex dispersion of a concentration of less than 25% but not substantially less than 10% solids but sufficient to avoid running upon a smooth surface for which the latex has little adhesion, regulating the quantity of latex applied in each coat, the concentration of the latex and the distance through which the latex is sprayed so as to insure a sufficient moisture content to cause the latex to spread freely over the surface without objectionable running, and drying each coat at such a rate that the latex will not run but more slowly than to cause such rapid evaporation of the water as to produce an irregular or porous coat.

8. A method of producing an extremely thin impervious rubber film which comprises spraying a plurality of coats of a latex dispersion of a concentration of less than 25% but not substantially less than 10% solids but sufficient to avoid running upon a smooth surface for which the latex has little adhesion, regulating the supply of latex so as to apply not more than about 3 grams of rubber per square yard of the surface for each coat, the spray having its droplets sufficiently small to prevent running as they strike the smooth surface, the spray passing through a distance of not more than 15 inches before reaching the surface, and drying each coat before the application of the next at a temperature below the boiling point of the dispersion.

9. A method of producing an extremely thin impervious rubber film which comprises spraying a plurality of more than 10 coats of a latex dispersion having a solids content between 10 and 25% upon a smooth surface from which the film may subsequently be readily stripped, regulating the quantity of rubber applied in each coat between .3 and 3 grams per square yard depending upon the thickness of the film desired and the number of coats employed, adjusting the spray to provide droplets sufficiently small to prevent running as they strike the smooth surface, causing the spray to pass through a distance of between 11 and 15 inches before reaching the surface, and drying each coat before the application of the next at a temperature between 140° and 180° F.

MARC ALFRED CHAVANNES.

REFERENCES CITED

The following references are of record in the file of this patent:

UNITED STATES PATENTS

| Number | Name | Date |
| --- | --- | --- |
| Re. 22,290 | Teague et al. | Mar. 16, 1943 |
| 1,812,279 | Axline | June 30, 1931 |
| 1,946,090 | McGavack | Feb. 6, 1934 |
| 1,949,159 | Glidden | Feb. 27, 1939 |
| 1,969,101 | Semon | Aug. 7, 1934 |
| 2,055,002 | Chandler | Sept. 22, 1936 |
| 2,120,720 | Spanel | June 14, 1938 |
| 2,161,454 | Calvert | June 6, 1939 |
| 2,235,682 | Hawley | Mar. 18, 1941 |
| 2,289,151 | Teague | July 7, 1942 |

FOREIGN PATENTS

| Number | Country | Date |
| --- | --- | --- |
| 229,404 | Great Britain | Feb. 23, 1925 |
| 542,204 | Great Britain | Dec. 31, 1941 |